United States Patent [19]

Willis

[11] Patent Number: 5,016,837

[45] Date of Patent: May 21, 1991

[54] VENTURI ENHANCED AIRFOIL

[75] Inventor: Mark T. Willis, San Diego, Calif.

[73] Assignee: Venturi Applications, Inc., San Diego, Calif.

[21] Appl. No.: 426,536

[22] Filed: Oct. 24, 1989

Related U.S. Application Data

[63] Continuation of Ser. No. 66,223, Jun. 25, 1987, abandoned.

[51] Int. Cl.$^5$ .............................................. B64C 21/04
[52] U.S. Cl. ................................ 244/12.1; 244/23 R; 244/207; 244/208
[58] Field of Search .................... 244/12.1, 12.3, 23 R, 244/23 B, 23 A, 23 C, 53 R, 55, 87, 207–209; 239/DIG. 7, 265.17; 417/197, 179

[56] References Cited

U.S. PATENT DOCUMENTS

| | | | |
|---|---|---|---|
| 1,691,942 | 11/1928 | Stalker . | |
| 1,829,616 | 10/1931 | Stalker . | |
| 1,836,592 | 12/1931 | Hammond . | |
| 1,843,993 | 2/1932 | Stalker . | |
| 1,868,832 | 7/1932 | Henter et al. . | |
| 2,041,790 | 5/1936 | Stalker | 244/12 |
| 2,041,792 | 5/1936 | Stalker | 244/12 |
| 2,041,793 | 5/1936 | Stalker | 244/12 |
| 2,071,744 | 2/1937 | Anathor Henrickson | 244/23 |
| 2,241,521 | 5/1941 | Richard | 244/45 |
| 2,568,812 | 9/1951 | Lee | 244/52 |
| 2,631,794 | 3/1953 | Warner | 244/12.1 |
| 2,840,323 | 6/1958 | Hood, Jr. et al. | 244/87 |
| 2,922,277 | 1/1960 | Bertin | 60/35.5 |
| 2,946,540 | 7/1960 | Coanda | 244/207 |
| 2,990,138 | 6/1961 | Shaw | 244/207 |
| 3,013,744 | 12/1961 | Klapproth | 244/12.3 |
| 3,029,045 | 4/1962 | Bertin et al. | 244/12.3 |
| 3,045,947 | 7/1962 | Bertin et al. | 244/207 |
| 3,063,658 | 11/1962 | Griswold II | 244/207 |
| 3,124,322 | 3/1964 | Cockerell | 244/12 |
| 3,129,905 | 4/1964 | Taylor | 244/42 |

(List continued on next page.)

FOREIGN PATENT DOCUMENTS

805817 12/1936 France ................................ 244/12.1
1267920 12/1961 France ................................ 244/12.1

OTHER PUBLICATIONS

NASA Conference Publication 2432, "Proceedings of the Circulation-Control Workshop 1986", Feb. 19–21, 1986.

*Primary Examiner*—Galen Barefoot
*Attorney, Agent, or Firm*—Kenyon & Kenyon

[57] ABSTRACT

A basic airfoil has its operating performance improved by incorporating one or more apertures in the airfoil adjacent its trailing edge. These apertures extend from the upper surface of the airfoil down through to the lower surface of the airfoil. The entry port and the exit port of these apertures has a greater circumference than that of the throat circumference which is intermediate thereto. This structure forms a venturi having a vertical axis. Spaced below the throat of the aperture are a plurality of air nozzles that communicate with an air plenum chamber within the airfoil. A source of pressurized air is connected to the plenum chamber. The leading edge of the airfoil causes air to flow across both the upper surface and lower surface of the airfoil. The venturi creates a strong suction on the upper surface of the airfoil to enhance the airfoil's pressure differential. When the axis of the venturi is inclined forwardly with respect to the horizontal axis of the airfoil, a vector with respect to the horizontal axis of the airfoil, a vector thrust in the forward direction is created in the same direction as that of the low pressure side of the airfoil. The venturi enhanced airfoil can be utilized both in a horizontal fixed airfoil or its structure can also be incorporated into the tail rudder of an aircraft or helicopter. The venturi enhanced airfoil can be oriented in any position between the horizontal and vertical axes.

26 Claims, 3 Drawing Sheets

U.S. PATENT DOCUMENTS

| | | | |
|---|---|---|---|
| 3,149,805 | 9/1964 | Frey et al. | 244/42 |
| 3,178,131 | 4/1965 | Laing | 244/15 |
| 3,179,353 | 4/1965 | Peterson | 244/12.3 |
| 3,201,067 | 8/1965 | Meyerhoff | 244/23 |
| 3,237,892 | 3/1966 | Elliott et al. | 244/73 |
| 3,291,420 | 12/1966 | Laing | 244/42 |
| 3,379,395 | 4/1968 | Smith | 244/12.1 |
| 3,525,474 | 8/1970 | Von Ohain et al. | 417/179 |
| 3,747,874 | 7/1973 | Johnsen | 239/265.17 |
| 3,770,227 | 11/1973 | Von Ohain et al. | 244/42 |
| 3,819,134 | 6/1974 | Throndson | 244/207 |
| 3,831,887 | 8/1974 | Fosness | 244/42 |
| 3,856,238 | 12/1974 | Malvestuto | 244/5 |
| 3,887,147 | 6/1975 | Grieb | 244/207 |
| 3,910,529 | 10/1975 | Putnam | 244/12.3 |
| 3,965,836 | 6/1976 | Malvestuto, Jr. | 114/66.5 |
| 4,033,526 | 7/1977 | Benson | 244/15 |
| 4,146,197 | 3/1979 | Grotz | 244/12.5 |
| 4,442,986 | 4/1984 | Rousseau | 244/207 |
| 4,666,104 | 5/1987 | Kelber | 244/12.1 |

VENTURI ENHANCED AIRFOIL

This application is a continuation of application Ser. No. 066,233, filed June 25, 1987, now abandoned.

BACKGROUND OF THE INVENTION

The invention relates to an airfoil and more specifically to an airfoil having a venturi assembly incorporated therein adjacent the trailing edge of the airfoil to enhance its performance.

Since the early days of the invention of the airplane, there has been a continuous effort to improve the lift characteristics of the airfoils of an aircraft. The airfoil configuration of the wings are varied according to the desired performance required by the aircraft.

Some attempts have been made to incorporate novel structure into the wing itself to enhance its lift performance. One such example is that of the rotor augmented wing illustrated in U.S. Pat. No. 3,372,891. In this patent the inventor has incorporated a semicircular recess in its trailing edge and has mounted a powered rotor therein about the axis of the recess. The rotor produces direct upward thrust on the aircraft and also creates low pressure over the wing and higher presssure below the wing to augment the direct upward thrust of the rotor.

It is an object of the invention to provide a novel airfoil with a venturi assembly positioned adjacent its trailing edge for increasing its lift characteristics.

It is also an object of the invention to provide a novel airfoil that can be used to enhance the performance of a fixed wing of an aircraft or also be incorporated into the rudder of an aircraft.

It is another object of the invention to provide a novel airfoil that has a venturi assembly formed in the wing structure that has air nozzles around its perimeter just aft of its throat through which high pressure air is directed to enhance the performance of the venturi.

It is a further object of the invention to provide a novel airfoil that can be used to replace the current tail rotor system of a helicopter.

SUMMARY OF THE INVENTION

Applicant's novel venturi enhanced airfoil has application in both a fixed horizontal airfoil of an aircraft or its structure may be incorporated into the vertical rudder of the tail section of an aircraft or helicopter. In the fixed horizontal airfoil application, the leading edge of the airfoil causes airflow across both the upper and lower surface of the airfoil. The velocity of the air passing over the upper surface of the airfoil is greater than that passing beneath its lower surface thereby causing a lower pressure on the top surface of the airfoil which results in lift of the airfoil itself in a static condition. Applicant's novel venturi assembly is incorporated into the airfoils structure adjacent the trailing edge thereof. The venturi has an entry port at its upper end, an exit port at its lower end, both which have a greater circumference than the throat portion intermediate its top and bottom end. A plurality of air nozzles are spaced around the circumference of the venturi at a position between the throat and the exit port thereof. These air nozzles are in communication with a plenum chamber within the airfoil that is supplied with pressurized air from either the engine of the aircraft or some auxiliary source. This produces an air driven venturi which creates a strong suction on the upper surface of the airfoil. This further increases the velocity of the air passing over the top surface of the airfoil to further decrease the pressure on the top side of the airfoil. The air which has been sucked down through the venturi assemby further increases the high pressure force on the bottom of the airfoil and also slows the velocity of the air passing along the lower surface of the airfoil. The combination of these different forces results in additional lift performance for the airfoil itself.

The venturi assembly has a vertical axis and this axis can be incorporated into the airfoil at an angle with respect to the horizontal axis of the airfoil between a range of two degrees to twenty degrees. This inclination results in a vectored thrust in the forward direction that the wing would be traveling in. The geometrical configuration of the venturi's aperture can be circular, elongated oval shaped, or other desired geometrical shapes. There may be more than one venturi assembly formed adjacent the trailing edge of an airfoil.

The venturi enchanced airfoil can also be incorporated into the rudder of the tail of an aircraft or helicopter. The rudder can have either a single venturi assembly incorporated therein or multiple venturi assemblys incorporated therein. Additionally one venturi assembly could have its entry port on one vertical side of the airfoil and the other venturi assembly could have its entry port on the opposite side of the airfoil. In the arrangement having the entry ports on opposite sides of the airfoil, they can create their suction effects on both sides of the airfoil, which in turn can move the airfoil in either direction in a static condition. This effect can be created by increasing and decreasing the pressurized airflow in the particularly desired venturi in order to move the airfoil in the direction so desired. One application for this detailed structure would be to use it to replace the current tail rotor system of a helicopter. In this type of an embodiment, the exhaust gas from the turbine of the helicopter can be ducted to the front of the verticle venturi enhanced airfoil which will be mounted on the end of the helicopters tail boom. In this configuration the enhanced airfoil will act as a rudder with the enhanced pressure differential acting against the main rotor torque.

DESCRIPTION OF A PREFERRED EMBODIMENT

Figure 1:
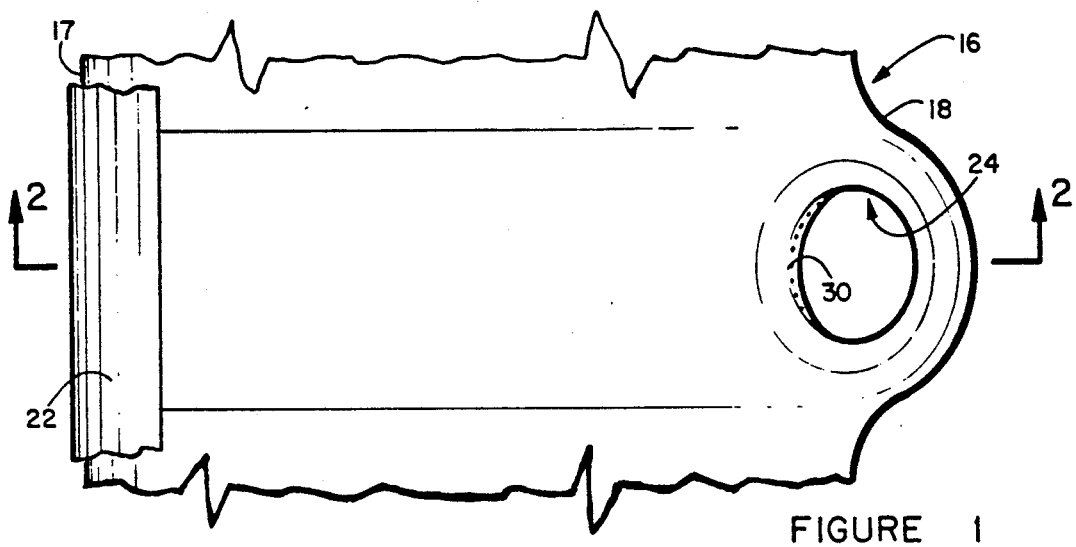
FIG. 1 is a partial top plan view illustrating applicant's novel venturi enhanced airfoil.
Figure 2:
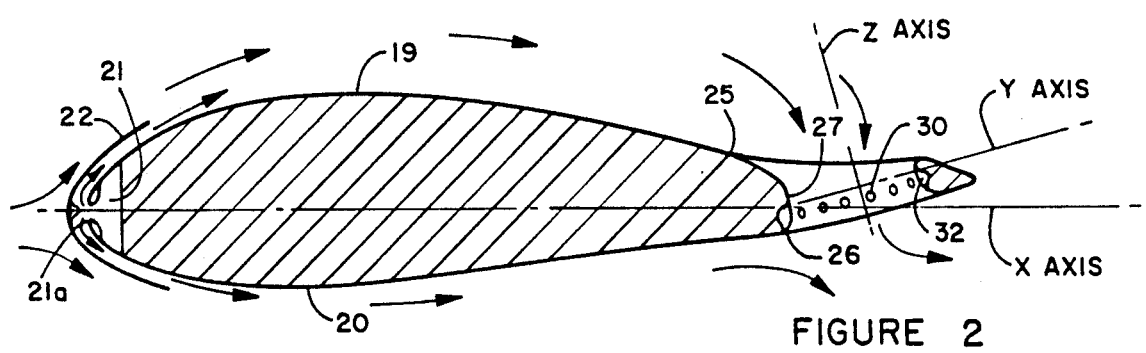
FIG. 2 is a schematic cross-sectional elevation view taken along lines 2—2 of FIG. 1.
Figure 4:
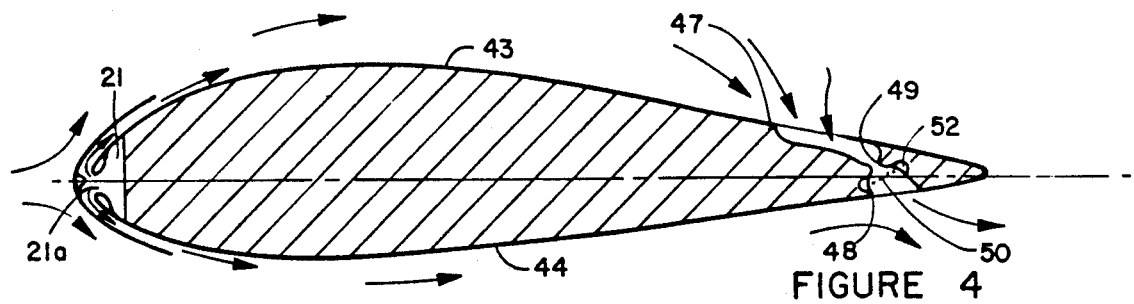
FIG. 4 is a schematic cross sectional elevational view taken along line 4—4 of FIG. 3.

Applicant's novel venturi enhanced airfoil will now be described by referring to FIGS. 1-11 on the drawings. In FIG. 1 the fixed wing airfoil is generally designated numeral 16. It has a leading edge 17, a trailing edge 18, an upper surface 19, and a lower surface 20. A deflector cap 22 is mounted adjacent and covering leading edge 17. A venturi assembly 24 is located adjacent trailing edge 18. A plenum chamber 21 is positioned in leading edge 17 and pressurized air is released through orifice 21a to travel over both the respective upper and lower surfaces 19 and 20.

Figure 5:
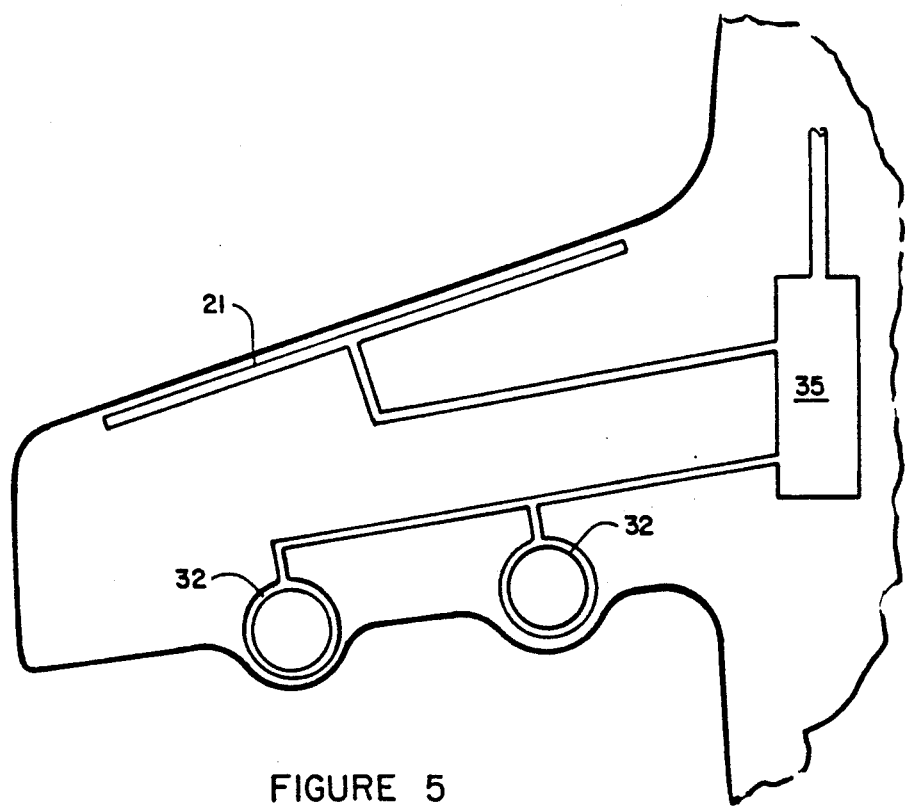
FIG. 5 is a schematic illustration that indicates how air is supplied to the venturi assemblies.

Venturi assembly 24 has an entry port 25, an exit port 26, and a throat 27. Venturi assembly 24 has a vertical x-axis with respect to the y-axis. The y-axis has a forward inclination with the x-axis and this may be designed between the range of two to twenty degrees. Positioned slightly below throat 27 are a plurality of air nozzles 30 that are in communication with a plenum chamber 32. Conventional ducting (not shown) would be connected to plenum chamber 32 from a source of pressurized air, such as the exhaust of the aircraft. A schematic illustration of such a system is illustrated in FIG. 5 where numeral 35 identifies a source of pressurized air.

Figure 3:
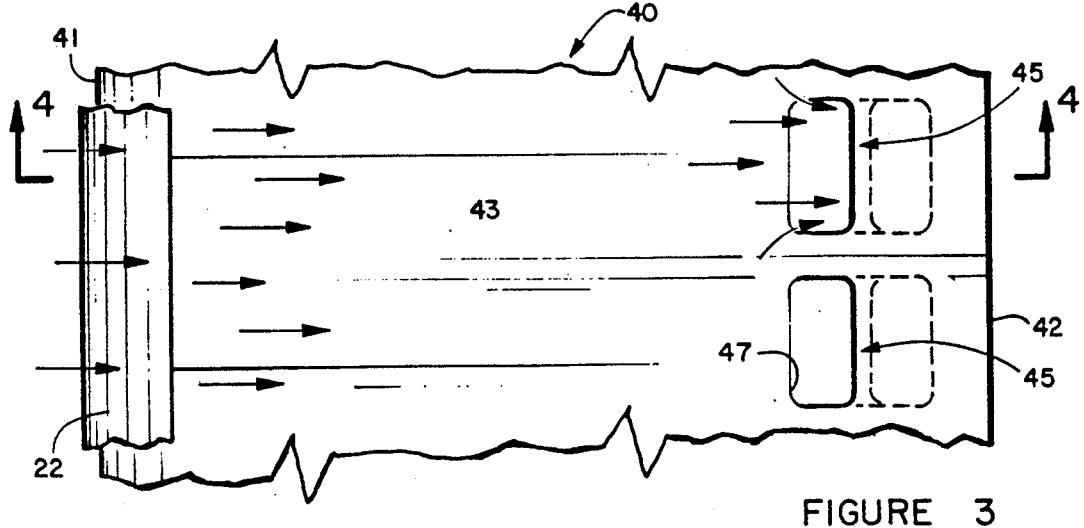
FIG. 3 is a partial top plan view illustrating a first alternative venturi enhanced airfoil.

The airfoil illustrated in FIG. 3 is designated numeral 40. It has a leading edge 41, a trailing edge 42, an upper surface 43, and a lower 44. It has a plurality of venturi assemblies 45 and these have an elongated oval-shape. Each of them have an entry port 47, an exit port 48, and a throat 49. Air nozzles 50 are in communication with plenum chamber 52.

Figure 6:
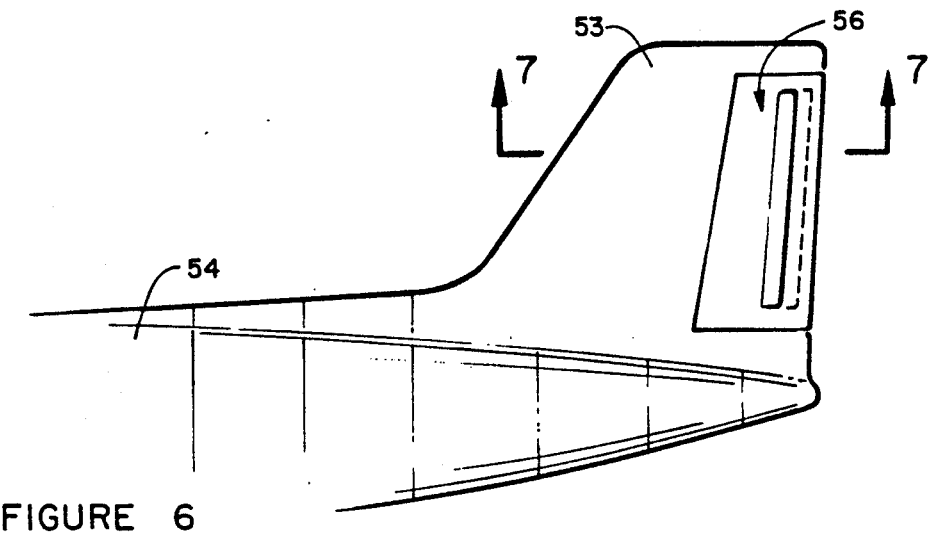
FIG. 6 is a side elevation view of the venturi enhanced airfoil utilized in the tail of an aircraft.
Figure 7:
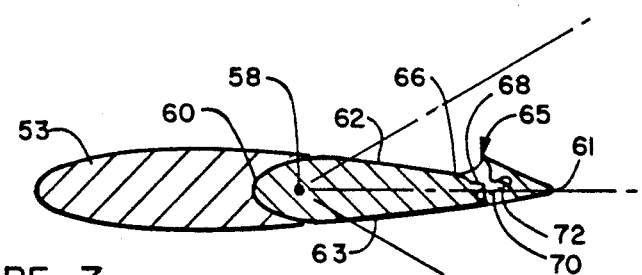
FIG. 7 is a horizontal cross section taken along lines 7—7 of FIG. 6.

In FIG. 6 an embodiment is illustrated that shows the venturi enhanced airfoil incorporated into the tail 53 of the fuselage 54 of an aircraft. The aircraft may be a fixed airfoil type of conventional aircraft or it may be the tail of a helicopter. Airfoil 56 functions as the rudder and it pivots about an axis 58. Utilizing the same descriptive designations to airfoil 56 as that of the horizontally oriented airfoils, it has a leading edge 60, a trailing edge 61, an upper surface 62, and a lower surface 63. The venturi assembly 65 has an entry port 66, an exit port 67, and a throat 68. A plurality of air nozzles 70 are in communication with a plenum chamber 72. Plenum chamber 72 would have conventional ducting from a pressurized air supply source.

Figure 8:
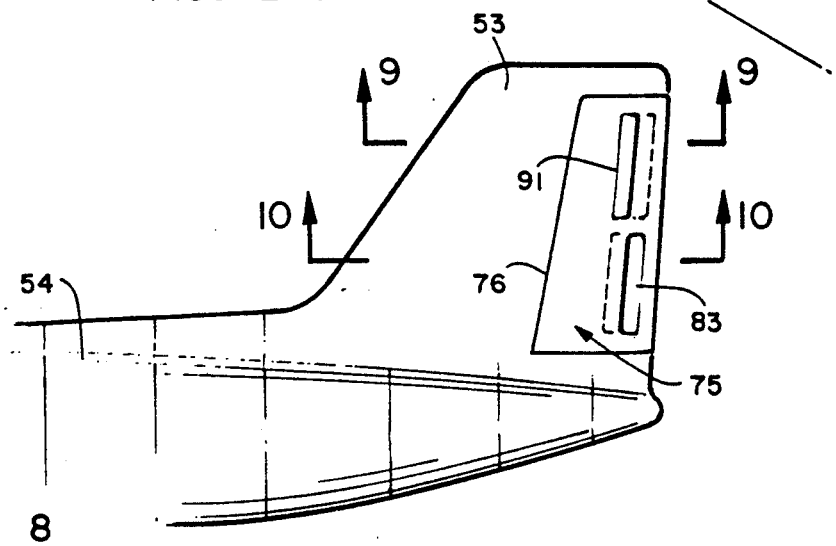
FIG. 8 is a first alternative embodiment of the venturi enhanced airfoil utilized in the tail of an aircraft.
Figure 9:
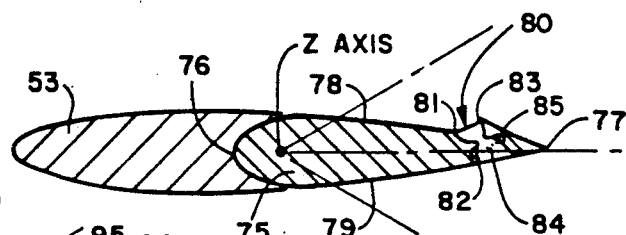
FIG. 9 is a horizontal cross sectional view taken along lines 9—9 of FIG. 8.
Figure 10:
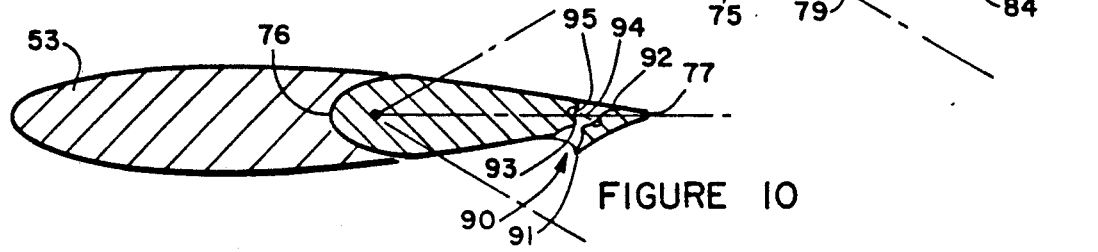
FIG. 10 is a horizontal cross sectional view taken along lines 10—10 of FIG. 8.

In FIGS. 8-10, a first alternative embodiment of the vertically oriented venturi airfoil is illustrated. Its airfoil 75 has a leading edge 76, a trailing edge 77, an upper surface 78, and a lower surface 79. An upper venturi assembly 80 has its entry port 81 on one side of airfoil 75 while the lower venturi assemly 90 has its entry port 91 on the opposite side. Venturi assembly 80 also has an exit port 82, a throat 83, air nozzles 84 and a plenum chamber 85. Likewise lower venturi assembly 90 also has an exit port 92, a throat 93 air nozzles 94, and a plenum chamber 95.

Figure 11:
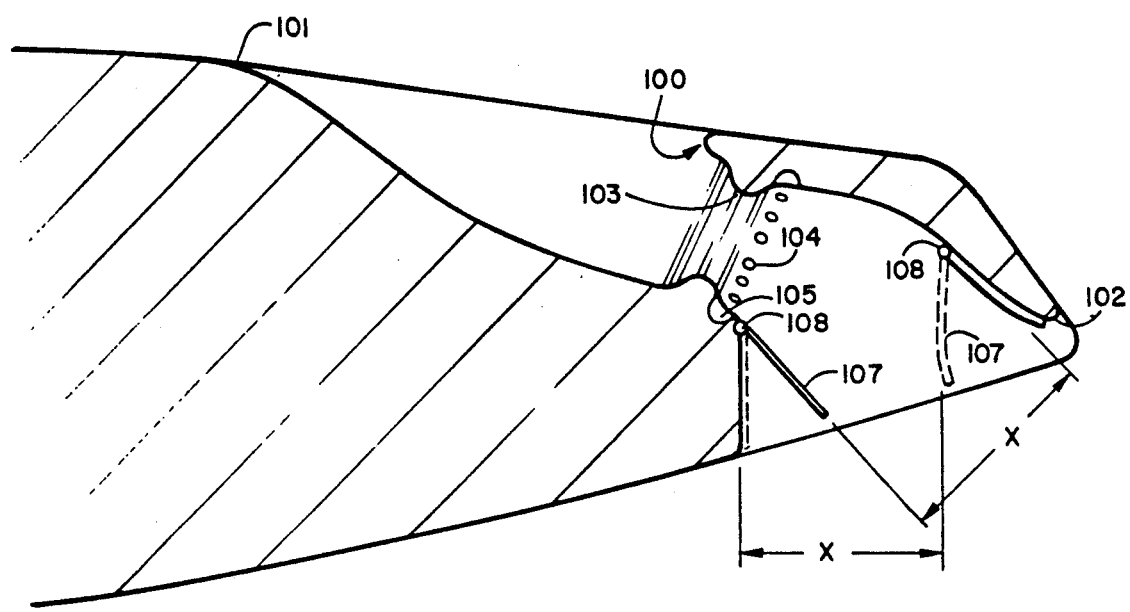
FIG. 11 is a partial cross sectional view illustrating a modified venturi assembly in the horizontal fixed airfoil of an aircraft.

A modified structure of a venturi assembly 100 is illustrated in FIG. 11 in a horizontal fixed wing. It has an entry port 101, an exit port 102, and a throat 103. A plurality of air nozzles 104 are in communication with a plenum chamber 105. Deflector vanes 107 are pivoted on hinge 108 and can be actuated together in coordinated travel to vary the direction of the air flow exiting venturi assembly 100.

It is to be noted that applicant's novel airfoil construction could be uused on a water vehicle to aid in lifting its hull partially or entirely out of the water. It would also provide forward thrust.

What is claimed is:

1. An aircraft comprising:
an airfoil, said airfoil defining an upper surface, a lower surface, a leading edge, and a trailing edge, said airfoil further defining a slot extending therethrough between said upper surface and said lower surface, said slot thus defining an entrance port in said upper surface and an exit port in said lower surface, said exit port being located farther aft on said airfoil than said entrance port, said slot being located adjacent to said tailing edge and defined by a throat portion, a converging portion extending from said entrance port and converging inwardly toward said throat portion, and a diverging portion extending from said throat portion and diverging outwardly therefrom toward said exit port, said diverging portion terminating on said lower surface,
said airfoil further defining a first plenum chamber located adjacent to said slot, and a plurality of ejector nozzles extending through a wall defining said slot, said ejector nozzles being in fluid communication with said first plenum chamber; and
means for supplying pressurized gas coupled to said first plenum chamber, said first plenum chamber in turn ejecting the pressurized gas through said ejector nozzles and into said diverging portion of said slot.

2. An aircraft as defined in claim 1, wherein
said converging portion of said slot defines a substantially circular periphery in said upper surface, and said diverging portion of said slot defines a substantially circular periphery in said lower surface.

3. An aircraft as defined in claim 1, wherein
said converging portion of said slot defines a substantially rectangular periphery in said upper surface, and said diverging portion of said slot defines a substantially rectangular periphery in said lower surface.

4. An aircraft as defined in claim 1, wherein
said ejector nozzles are located within said throat portion on the side thereof adjacent to said diverging portion.

5. An aircraft as defined in claim 1, wherein
said airfoil further defines a second plenum chamber adjacent to said leading edge, and an ejector passage extending through aid leading edge in fluid communication with said second plenum chamber, said second plenum chamber being coupled to said means for supplying pressurized gas, the pressurized gas flowing into said second plenum chamber and through said ejector passage.

6. An aircraft as defined in claim 5, wherein
said airfoil defines a plurality of said slots spaced apart from each other adjacent to said trailing edge.

7. An aircraft as defined in claim 6, wherein
each of said slots defines a substantially circular periphery in said upper surface and a substantially circular periphery in said lower surface of said airfoil.

8. An aircraft as defined in claim 6, wherein
each of said slots defines a substantially rectangular periphery in said upper surface and a substantially rectangular periphery in said lower surface of said airfoil.

9. An aircraft as defined in claim 6, said aircraft further comprising:
a deflector member mounted to said leading edge of said airfoil in front of said ejector passage, said deflector member deflecting the flow of pressurized gas through said ejector passage over said upper and lower surfaces of said airfoil.

10. An aircraft as defined in claim 9, wherein an axis perpendicular to the longitudinal axes of said slots is oriented at an angle with respect to the chord line of said airfoil within the range of about 2° to 20°.

11. An aircraft as defined in claim 1, wherein said airfoil is a tail rudder of said aircraft.

12. An aircraft as defined in claim 1, wherein said airfoil is a wing of said aircraft.

13. An aircraft as defined in claim 1, wherein said airfoil defines a plurality of said slots spaced apart from each other adjacent to said trailing edge, and said converging portion of at least one of said slots extends from said lower surface and converges inwardly toward said throat portion, and said diverging portion of said slot terminates on said upper surface, and
said converging portion of at least one of said other slots extends from said upper surface and converges inwardly toward said throat portion, and said diverging portion of said slot terminates on said lower surface of said airfoil.

14. An aircraft comprising:
a fuselage;
at least one wing supported from said fuselage and projecting outwardly therefrom, said wing defining a leading edge, a trailing edge, an upper surface extending from said leading edge to said trailing edge, and a lower surface extending from said leading edge to said trailing edge on the opposite side of said upper surface,
said wing further defining an aperture extending therethrough from said upper surface to said lower surface, said aperture thus defining an entrance port in said upper surface and an exit port in said lower surface, said exit port being located farther aft on said wing than said entrance port, said aperture being located adjacent to said trailing edge and defined by a throat section, an inlet section diverging outwardly from said throat section toward said upper surface, and an outlet section diverging outwardly from the other side of said throat section and terminating on said lower surface,
said wing further defining at least one ejector passage extending through a wall defining said aperture, said ejector passage being located between about the middle of said throat section and said lower surface of said wing, said wing further defining a first plenum chamber in fluid communication with said ejector passage; and
means for supplying pressurized gas coupled to said first plenum chamber, the gas being supplied to said first plenum chamber and in turn ejected through said ejector passage into the outlet section of said aperture.

15. An aircraft as defined in claim 14, wherein said aperture defines a substantially circular periphery in said upper surface and said lower surface of said wing.

16. An aircraft as defined in claim 14, wherein said aperture defines a substantially rectangular periphery in said upper surface and said lower surface of said wing.

17. An aircraft as defined in claim 14, wherein said wing further defines a second plenum chamber adjacent to its leading edge, and a nose slot extending through said leading edge and in fluid communication with said second plenum chamber, said second plenum chamber being coupled to said means for supplying pressurized gas, the pressurized gas flowing into said second plenum chamber and in turn through said nose slot.

18. An aircraft as defined in claim 17, said aircraft further comprising:
a deflector member mounted to said wing in front of said nose slot, said deflector member deflecting the flow of pressurized gas over said upper and lower surface of said wing.

19. An aircraft as defined in claim 14, wherein said wing defines a plurality of said apertures spaced apart from each other adjacent to said trailing edge.

20. An aircraft as defined in claim 14, wherein the longitudinal axis of said aperture extending substantially in a direction from said upper surface to said lower surface is oriented at angle with respect to the chord line of said wing within the range of about 70° and 88°.

21. An airfoil wherein
said airfoil defines a venturi-shaped aperture extending therethrough, said venturi-shaped aperture being located adjacent to the trailing edge of said airfoil and extending between the upper and lower surfaces thereof, said venturi-shaped aperture thus defining an entrance port in said upper surface and an exit port in said lower surface, said exit port being located farther aft on said airfoil than said entrance port, said venturi-shaped aperture being defined by a throat portion, a converging portion extending from the upper surface and converging inwardly toward said throat portion, and a diverging portion diverging outwardly from said throat portion and terminating on the lower surface of said airfoil,
said airfoil further defining a first ejector passage extending through a wall defining said venturi-shaped aperture, and
said airfoil further defining a first chamber coupled to said first ejector passage, said first chamber being adapted to eject pressurized gas through said first ejector passage and into said venturi-shaped aperture.

22. An airfoil as defined in claim 21, wherein said airfoil further defines a second chamber therein adjacent to its leading edge, and a second ejector passage extending through its leading edge and in fluid communication with said second plenum chamber, said second plenum chamber being adapted to eject pressurized gas through said second ejector passage.

23. An airfoil as defined in claim 22, said airfoil comprising:
a deflector member mounted to the leading edge of said airfoil in front of said second ejector passage, said deflector member directing the flow of gas through said second ejector passage over the upper and lower surfaces of said airfoil.

24. An airfoil as defined in claim 21, wherein said venturi-shaped aperture defines a substantially rectangular periphery in the upper surface and in the lower surface of said airfoil.

25. An airfoil as defined in claim 21, wherein said first ejector passage is located between said throat portion and the lower surface of said airfoil.

26. A method of controlling air flow over an airfoil by
ejecting pressurized gas through an aperture extending between the upper and lower surfaces of the airfoil, the aperture being located adjacent to the trailing edge of the airfoil and terminating on its lower surface, the aperture including an entrance port in the upper surface of the airfoil and an exit port in the lower surface of the airfoil, the exit port being located farther aft on the airfoil than the entrance port, thus producing a lower pressure zone within the aperture adjacent to the lower surface of the airfoil and causing air to flow from the low pressure side of the airfoil to the high pressure side of the airfoil to increase the lift on the airfoil.

* * * * *